United States Patent

Barcomb et al.

[11] 3,921,517
[45] Nov. 25, 1975

[54] RANDOM FIRING OF MULTIPLE WIDTH PRINT HAMMERS

[75] Inventors: James G. Barcomb; Robert K. Conant, both of Endicott, N.Y.

[73] Assignee: International Business Machines Corporation, Armonk, N.Y.

[22] Filed: June 21, 1974

[21] Appl. No.: 481,718

[52] U.S. Cl. ............................ 101/93.09; 101/93.14
[51] Int. Cl.² ......................................... B41J 9/14
[58] Field of Search .......... 101/93.09, 93.14, 93.13, 101/93.15, 93.16–93.18; 340/172.5

[56] References Cited
UNITED STATES PATENTS

| | | | |
|---|---|---|---|
| 2,993,437 | 7/1961 | Demer et al. | 101/93.14 |
| 3,066,601 | 12/1962 | Eden | 101/93.14 |
| 3,183,830 | 5/1965 | Fisher et al. | 101/93.03 |
| 3,220,343 | 11/1965 | Wasserman | 101/93.09 |
| 3,303,776 | 2/1967 | Rausch | 101/93.14 |
| 3,602,138 | 8/1971 | Barcomb | 101/93.14 |
| 3,654,857 | 4/1972 | Marsh | 101/93.09 X |
| 3,672,297 | 6/1972 | Berglund et al. | 101/93.09 |
| 3,795,186 | 3/1974 | Curtiss et al. | 101/93.14 |

*Primary Examiner*—Edgar S. Burr
*Assistant Examiner*—R. T. Rader
*Attorney, Agent, or Firm*—Francis V. Giolma

[57] ABSTRACT

In a printer using print hammers covering two adjacent print positions, random firing of the print hammers is made possible by using additional storage means for storing three bits for each print position. When a print hammer is fired for one of a pair of associated print positions, a bit is loaded into the storage for the other of the associated print positions and the bit count is advanced each time the hammer is optioned to fire for the associated print position. When the bit count reaches 0 0 0 the print hammer may be fired again. For an intermediate count firing of the print hammer is inhibited.

7 Claims, 6 Drawing Figures

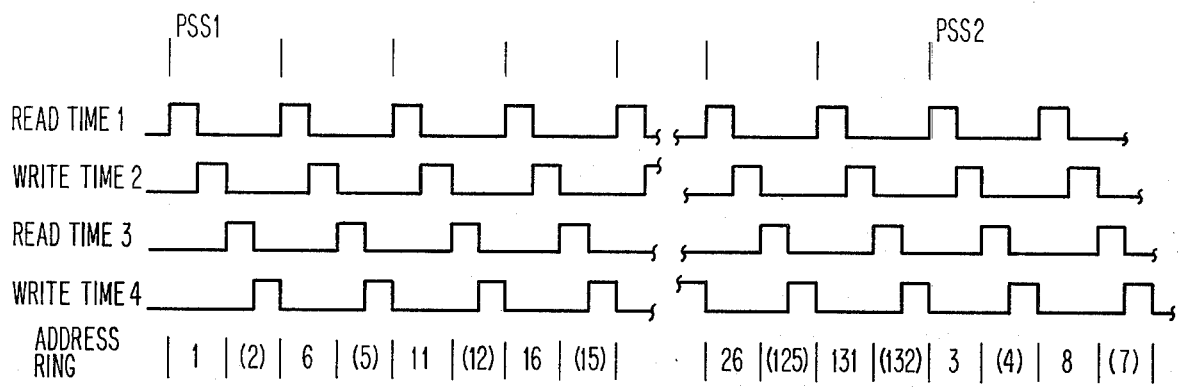
FIG. 2
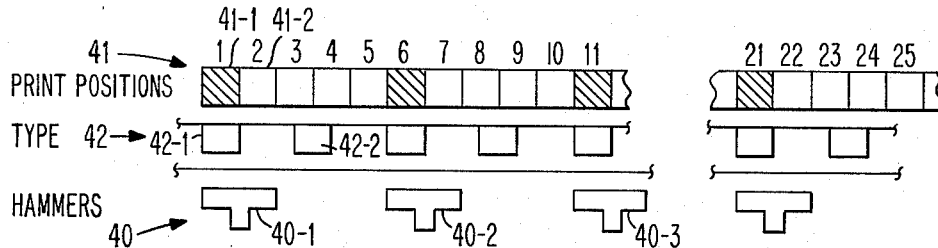
FIG. 3
| PSS # | PRINT POSITION | |
|---|---|---|
| 1 | 1, 6, 11, 16, 21 ---- | 116, 121, 126, 131 |
| 2 | 3, 8, 13 - | 118, 123, 128 |
| 3 | 5, 10, 15 - | 120, 125, 130 |
| 4 | 2, 7, 12 - | 117, 122, 127, 132 |
| 5 | 4, 9, 14 - | 119, 124, 129 |
| PSS # | HAMMER | |
|---|---|---|
| 1 | 1, 3, 6, 8, 11 - | 58, 61, 63, 66 |
| 2 | 2, 4, 7, 9, 12 - | 59, 62, 64 |
| 3 | 3, 5, 8, 10, 13 - | 60, 63, 65 |
| 4 | 1, 4, 6, 9, 11 - | 59, 61, 64, 66 |
| 5 | 2, 5, 7, 10, 12 - | 60, 62, 65 |
| PSS # | BELT CHARACTER | |
|---|---|---|
| 1 | 1, 3, 5, 7, 9 - | 47, 49, 51, 53 |
| 2 | 2, 4, 6, 8, 10 - | 48, 50, 52 |
| 3 | 3, 5, 7, 9, 11 - | 49, 51, 53 |
| 4 | 2, 4, 6, 8, 10 - | 48, 50, 52, 54 |
| 5 | 3, 5, 7, 9, 11 - | 49, 51, 53 |
FIG. 4

RANDOM FIRING OF MULTIPLE WIDTH PRINT HAMMERS

BACKGROUND OF THE INVENTION

1. Field of the Invention

This invention relates to printers and in particular to printers having print hammers which span more than one print position.

2. Description of Prior Art

U.S. Pat. No. 3,602,138, entitled "Print Hammer Driver Timing from a Print Buffer Ring", which issued on Aug. 31, 1971 to James G. Barcomb, discloses the use of a print buffer ring for controlling the duration of the firing pulse in a printer.

U.S. Pat. No. 3,183,830, entitled "Print Registration Control Means in High Speed Printers", which issued on May 18, 1965 to D. M. Fisher et al., discloses delay circuits individual to each print hammer for delaying the energization of the operating windings to compensate for different flight times.

U.S. Pat. No. 3,066,601, entitled "Error Checking Devices", which issued on Dec. 4, 1962 to Harold E. Eden, discloses the use of additional core planes for checking whether or not a print hammer optioned to print did in fact print.

It is also known in the Printer Art to provide a fixed time delay at the end of one subscan in which print hammers which cover two print positions are optioned to print in odd positions, before the next subscan may begin, in which the same print hammers may be optioned to print in even print positions, so that any hammer which fired in the first subscan may have time to settle-out before the next subscan is commenced.

SUMMARY OF THE INVENTION

Generally stated, it is an object of this invention to provide an improved printer.

More specifically, it is an object of the invention to provide for selectively controlling the firing of the print hammers in a printer having print hammers each covering more than one print position.

Another object of the invention is to eliminate the necessity for a time delay between different print scans in a printer having print hammers covering multiple print positions.

Still another object of the invention is to individually control the delay between successive firings of multiple width print hammers in a printer.

Yet another object of the invention is to provide for using storage means scanned by the address rings which scan the stored data to be printed, for controlling the time between successive firings of a print hammer which may be used to print in adjacent print positions.

It is also an important object of the invention to provide in a printer having a plurality of print hammers each of which is activated to print in two adjacent print positions, for using the address means which scans a plurality of positions in a storage device to determine what data is to be printed in the different print positions, to address a plurality of additional storage positions associated with each print position, and when a print hammer is fired for one print position to modify the address to address the additional storage positions for the adjacent print position of said print hammer and store a bit therein. Then when said adjacent print position is optioned to print in a later subscan, the count is indexed in said additional storage position until a predetermined count is reached whereupon the print hammer may be fired for said associated print position.

The foregoing and other objects, features and advantages of the invention will be apparent from the following more particular description of preferred embodiments of the invention as illustrated in the accompanying drawing.

DESCRIPTION OF THE DRAWING

In the drawing:

FIG. 2 shows a set of timing curves relating the various read and write timings used in the circuit of FIG. 1.

FIG. 3 is a schematic representation of the print hammers, type characters, and print positions in a printer embodying the invention.

FIG. 4 is a table showing the relations between the print hammers, type characters, and print positions during a sequence of five subscans.

DESCRIPTION OF A PREFERRED EMBODIMENT

Figure 1:
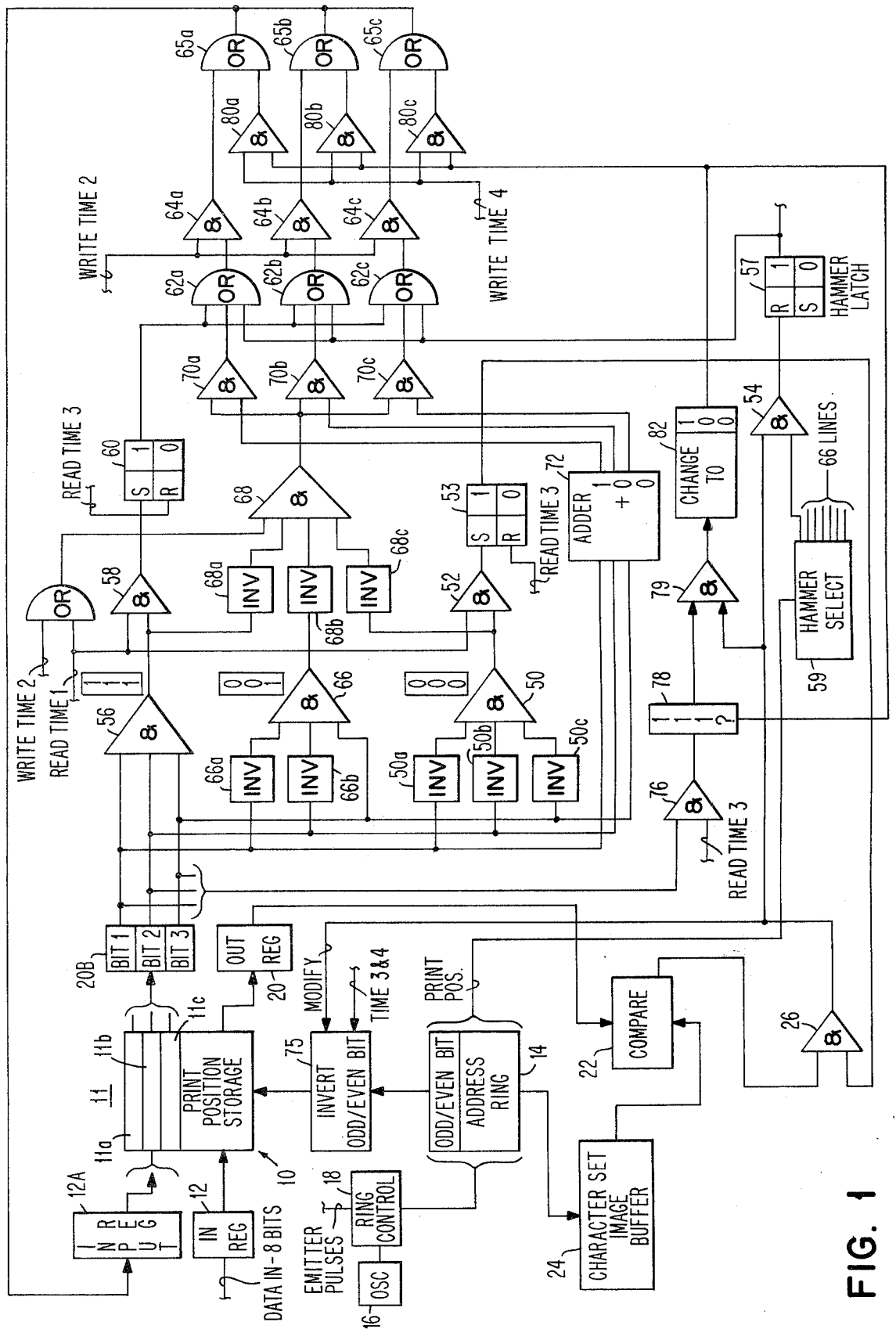
FIG. 1 is a schematic circuit diagram of portions of a printer control system embodying the invention in a preferred form.

Referring to FIG. 1 the reference numeral 10 denotes generally a storage device in a printer control system for storing data to be printed. Data is loaded into the storage device through an input register 12 over a data input line 13. Data is stored in the storage 10 and read out under the control of an address ring 14 controlled by an oscillator 16 through ring control circuits 18 under the control of emitter pulses produced in a well-known manner in timed relation with movement of a type element past different print positions. Data is read out of the storage device 10 into an output register 20 to compare means 22 where a comparison is made with the particular character on a type carrier at the print position as determined from a character set image buffer 24 which is addressed by the address ring 14 in timed relation with addressing of the print storage device 10.

Upon the occurrence of a compare from the compare circuit 22 a signal is applied to AND 26 for producing a fire hammer signal. This signal is applied to AND 28 for operating a hammer latch 30 to fire the selected hammer in response to an output from a hammer select matrix 32 which is addressed by the address rings 14, 15 in timed relation with the addressing of the print position storage 10.

Referring to FIG. 3 there is shown a schematic representation of a plurality of print hammers 40–1–2–3, etc. each of which covers two of a plurality of print positions 41–1, 2, 3, etc. for impacting different of the type 42–1, –2, etc. against a document at the different print positions for printing thereon. As shown, each hammer width equals 0.200 inches, the pitch of the type characters is 0.250 inches and the print positions are on a 0.100 inch spacing. Accordingly, a type character lines up with every fifth position, for example, at print positions 1, 6, 11, 16, etc. which may be scanned in one subcycle or print scan as shown by the table in FIG. 4. On subscan No. 2 a type character will be lined up with positions 3, 8, 13, etc. and so on for five subscans, whereupon a type character will have been presented to each of the print positions. This cycle is continued until all type characters have been presented to all type positions.

Figures 5, 6:
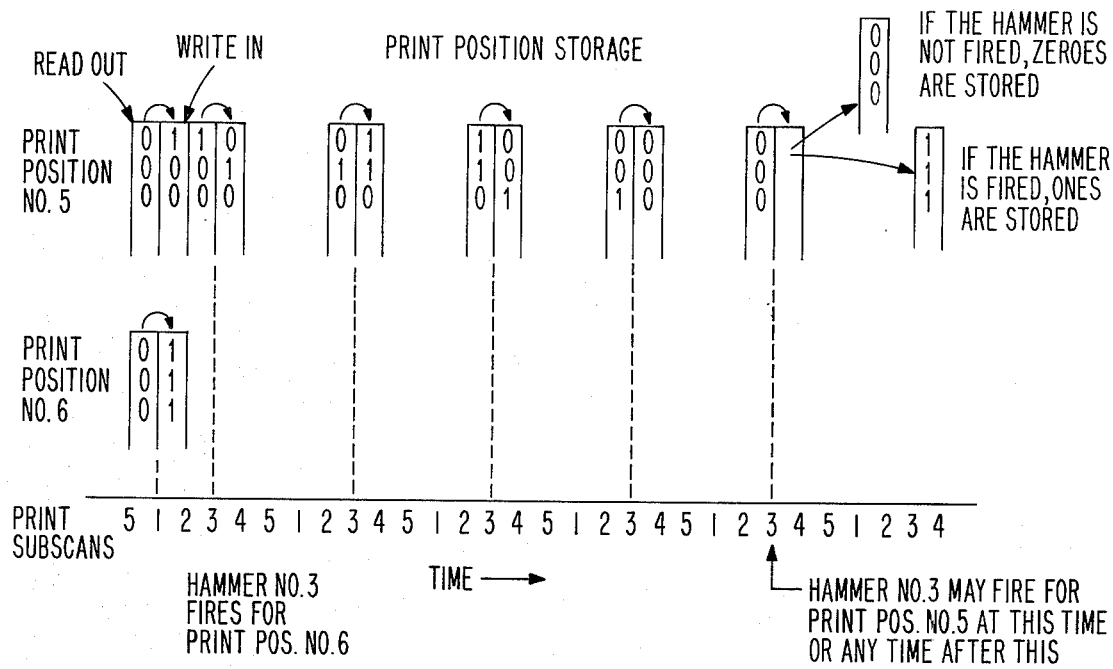
FIG. 5 is a schematic representation of the additional storage positions for two adjacent print positions No. 5 and No. 6, which are covered by print hammer No. 3 during a typical scanning operation.
FIG. 6 is a table showing the hammer firing matrix arrangement used with microprogrammed control of the print hammers.

In order to permit random firing of the print hammers, provision must be made to prevent successive firings of the same print hammer to print in adjacent print positions so soon that the print hammer may not have time to settle-out between the first firing and the second firing. For example, referring to FIGS. 4 and 5, it will be seen that if print hammer 40–3 is energized to print in position 41–6 during print subscan No. 1, it may be optioned to print in position 41–5 on print subscan No. 3. This is too soon for the hammer to fire again, so this must be prevented. To prevent such undesirable successive firing of a single print hammer, three additional storage positions 11 are provided for each print position of the print position storage 10 as represented by the planes 11–1, 11–2 and 11–3 having a three bit position input register 12A and a three bit position output register 20B. Now if a hammer such as hammer 40–3 fires for print position 41–6 print, position 11–5 will be loaded with a count of 001 in the additional storage means 11 as is shown in FIG. 5. Now when print position 41–5 is addressed on print subscan No. 3, a fire command can be prevented because enough time had not elapsed. This is done by utilizing AND 50 connected by inverters 50a, 50b and 50c to the output register 20B for providing a signal through AND 52 to a hammer fire latch 53 and through AND 26 and AND 28 to fire a hammer latch 30 in conjunction with a signal from the hammer select logic 32.

The logic diagram of FIG. 1 shows what happens for each new position of the character set. The character set image buffer 24 contains for each print position the character which is lined up with the hammer and may be printed. The print position storage 10 contains for each print position the characters that must be printed. Each time the character set has advanced to a new position, the address ring 14 indexes through the entire print position storage 10 and the character set image buffer 24, one print position at a time looking for the same characters in each. When the same character is found, the compare 22 provides a signal which permits the print hammer for that print position to be fired to print the character unless the hammer has already been fired less than four scans previously for the other print positions shared by this hammer. This previous firing is identified by the 3 identification bits in the additional storage 11a, 11b and 11c for the particular position. To accomplish this, each print position is read out of the print position storage. There are four steps performed at four different times. At read time 1 the three identification bits are read out and evaluated. If the bits are 1 1 1 then AND 56 provides an output which is gated with read time 1 at AND 58 to set a latch 60 providing an output to ORs 62a, b, and c for writing the bits back in at write time 2 through ANDs 64a, b and c into input register 12A. If the bits are 1 0 0 then AND 66 thru inverters 66a and 66b provides a signal to AND 68 which is inverted by inverter 68b so that at write time 2 a 0 0 0 is put back into storage through ANDs 70a, b and c, ORs 62a, b, c, ANDs 64a, b, c and ORs 65a, b, c. Inverters 68a and 68c invert the inputs from ANDs 58 and 50, respectively.

If the bits are 0 0 0 the hammer is allowed to fire by AND 52 and latch 53, provided of course that the character is correct as determined by the signal from compare 22 at AND 26. If the bits are 0 0 0 and no compare is received from the compare 22, the 0 0 0 is put back in at write time 2.

If the bits are 0 0 0 and the hammer does fire, a 1 1 1 is put into storage at write time 2 through ORs 62a, b and c and AND 64a, b and c. If the bits are not 1 1 1, 1 0 0 or 0 0 0 as determined by the ANDs 56, 66 and 50, then 0 0 1 is added through ANDs 70a, b, c to whatever the bits are by adder 72, and stored at write time 2 through ANDs 64a, 64b and 64c. Notice that the hammer firing is permitted only if the bits are 0 0 0 at read time 1 as determined by AND 50 and 52. No activity takes place during the cycle time 3 or 4 unless previous conditions produce a hammer fire. If the hammer is fired we wish to prevent its firing again in the shared print position until after the fourth scan later. During cycle times 3 and 4 the print position additional storage is addressed at the shared print position by modifying the odd/even bit in the storage address (an advantage is gained by numbering print positions from zero in which case a controlled inverter 75 may be used to invert the 1 bit of the address ring 14 to change the address from odd to even or vice versa). At read time 3 the three identification bits are read out through AND 76 and evaluated. The bits can only be 0 0 0 or 1 1 1 or we wouldn't have fired the hammer for the original print position. If the bits are 1 1 1 check circuit 78 indicates that the character has already been printed in that position and the 1 1 1 is restored to the additional storage through input register 12A during write time 4 through ANDs 80a, b, c. If the bits are 0 0 0 and not 1 1 1, a 0 0 1 is stored at write time 4 through AND 79, logic 82, ANDs 80a, b, c, ORs 65a, b, c and input register 12a. After cycle time 4 the modify signal is removed from the modifier 75 and address ring 14 advances to the next sequential print position to commence another sequence. FIG. 2 shows the relations of the various read and write time, with the numbers in parenthesis indicating the modified address when used.

Referring to FIG. 5 it will be seen that if hammer 40–3 fires for print position 41–6, a 0 0 0 is read out of the additional storage for that position and a 1 1 1 is read in when print position 41–6 is optioned during subscan No. 1. Through the operation of the address modifier 75 print position 41–5 is addressed and a 0 0 0 read out of its additional bit positions and a 1 0 0 read in. When the shared print position 41–5 is optioned during subscan No. 3, the 1 0 0 is read out and a 0 1 0 read in to the bit positions for print position 41–5. Subsequently, when print position 41–5 is addressed during the next print subscan No. 3 the 0 1 0 is read out and a 1 1 0 is read in. On the next subscan No. 3 the 1 1 0 is read out and a 0 0 1 is read in. During the next print subscan No. 3 the 0 0 1 is read out and a 0 0 0 is read in. Now, when hammer 40–3 is addressed for print position 41–5 on the following print subscan No. 3, since the bits in the additional storage are 0 0 0, the print hammer may be fired at this time or at any time after this for print position 41–5. Since each print position is optioned only once in every five subscans or once in a print scan, successive firings of the same print hammer are delayed for a minimum of 3.6 print scans or 12.78 ms, although 20 subscans or four print scans (14.2 ms), is more realistic.

Another method can be used if the hammer firing is microprogrammed controlled. When microprogramming is used the firing matrix shown in FIG. 6 is generally hit ahead of time if the same hammer is to be used too close together, i. e. the table shows hammer No. 1 fired in print subscan No. 1 and also in print subscan No. 4 which is too close together. Therefore another matrix is generated for the next pass of the belt which contains only those hammers which would have caused interference. These same hammer fires are removed from the original matrix before printing starts. This arrangement can be used to increase the average throughput of the printer from 50 to 150 per cent depending on the character set lengths which are used.

From the above description and the accompanying drawing it will be apparent that a new and novel printer control circuit is provided which utilizes additional bit positions in conjunction with each print storage position for data to be printed and utilizes the address rings addressing the print position storage to update the bit count in the additional print positions for controlling the firing of a particular hammer for printing on two adjacent positions so as to provide adequate time in between firings for hammer settle-out. By thus controlling the firing of the hammer time delays between subscans become unnecessary and increased throughput is obtained with the printer.

Reference is made to the F. M. Demer et al., patent, entitled "High Speed Printer Apparatus", U.S. Pat. No. 2,993,437, which issued on July 25, 1961 and discloses the broad idea of subcycle or print subscanning. Reference is also made to U.S. Pat. No. 3,303,776, entitled "Selective Character Arrangement of the Print Member in Printing Devices", which issued to F. Rausch on Feb. 14, 1967 and which discloses broadly the figure of character storage for the type characters on a type belt or the like.

While the invention has been particularly shown and described with reference to preferred embodiments thereof, it will be understood by those skilled in the art that various changes in form and details may be made without departing from the spirit and scope of the invention.

What is claimed is:

1. The combination in printer apparatus for printing on a document at a plurality of adjacent print positions along a print line on the document of,
    a movable type carrier having a plurality of type characters movable past said print positions and spaced apart at least one print position between adjacent type characters,
    a plurality of print hammers positioned at fixed locations along said print line each print hammer being wide enough to span and being capable of printing in two adjacent print positions,
    circuit means addressing said print hammers at spaced apart positions along said print line as said type characters move into alignment with said print positions in a plurality of sequential subscan relations and enabling a print hammer to fire when a type character to be printed is at an addressed print position spanned by said print hammer, and
    means including counter means connected to said addressing means responsive to firing a print hammer at one of said two adjacent print positions during one of said subscan relations to inhibit firing said print hammer for a predetermined number of subsequent subscan relations after said print hammer is fired to print in one of said adjacent print positions from printing in the other of said two adjacent print positions.

2. The invention as defined in claim 1 characterized by
    said means responsive to firing a print hammer comprising storage means having a plurality of bit positions at each of a plurality of different address positions corresponding to said print positions and
    means connecting said storage means to said addressing circuit means to store bits in said storage means each time a print hammer for an associated print position is fired.

3. The invention as defined in claim 2 characterized by said printer apparatus having storage means for data to be printed, other storage means storing representations of the type characters on said type carrier, and said address means being connected to said data storage means, said type character storage means and said storage means having said plurality of bit positions.

4. The invention as defined in claim 3 characterized by said plurality of print positions including adjacent odd and even numbered print positions and each print hammer spanning two adjacent print positions including an odd and an even numbered print positions, and address modification means operable to modify the addressing of said storage means having a plurality of bit positions and address the other of said odd/even positions when said print hammer is fired for one of a pair of odd/even print positions.

5. The invention as defined in claim 4 characterized by said type characters on said carrier having a greater spacing than double the width of each of said print positions, and said address means being connected to said data storage means and said type character storage means by subscan pulse means to address said data storage means and said type character storage means at different spaced address intervals.

6. In a printer having a plurality of print hammers arranged at fixed positions along a print line of a document, each of said hammers being wide enough to span two adjacent print positions along said print line and having means to actuate said print hammers and also having a type carrier movable to present type characters at adjacent print positions at different times to be impacted by said print hammers for printing in adjacent print positions at different times, said printer also having means for storing representations of data to be printed at different ones of said print positions along said print line, means for storing representations of said type characters on said type carrier, means for addressing said data storage means and said type character storage means in a spaced apart subscan sequence to determine when a compare exists between the type character on said type carrier at said print position and the type character representation in said storage means for said print position, and means responsive to a compare for energizing the print hammer for each print position for which a compare exists, the improvement which comprises,
    additional storage means having a plurality of storage positions corresponding to each of said print positions,
    means connecting said additional storage means to be addressed by said data storage addressing means in said same spaced apart subscan sequence as said data storage means and said type character storage means,
    means responsive to firing the print hammer for a particular print position to store a bit in said additional storage means for said adjacent print position when said print hammer for a particular print position is fired a first time, means responsive to a compare for said print position in a subsequent subscan operable to change the count of said bits each time a compare is found for said print position following said first time, and means responsive to said count connected to said compare means and said print hammer to prevent said print hammer from firing again until the bit count for said print position adjacent said particular print position and spanned by said same print hammer reaches a different predetermined count.

7. The invention as defined in claim 1 characterized by each print hammer being wide enough to span a pair of odd and even numbered adjacent print positions, and odd/even address modifying means comprising an odd/even latch connected to said addressing means to change the address from odd to even and vice versa so as to address the other one of an odd/even pair of print positions when one of said pair is fired to print.

* * * * *